United States Patent
Kim

(10) Patent No.: US 9,363,841 B2
(45) Date of Patent: Jun. 7, 2016

(54) TELEMATICS SYSTEM CAPABLE OF WI-FI DIRECT P2P CONNECTION USING NEAR FIELD COMMUNICATION

(71) Applicant: Hyundai Motor Company, Seoul (KR)

(72) Inventor: Geon Woo Kim, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/480,316

(22) Filed: Sep. 8, 2014

(65) Prior Publication Data

US 2015/0264729 A1 Sep. 17, 2015

(30) Foreign Application Priority Data

Mar. 13, 2014 (KR) .................. 10-2014-0029711

(51) Int. Cl.
*H04W 76/02* (2009.01)
*H04L 29/08* (2006.01)
*H04W 12/06* (2009.01)

(52) U.S. Cl.
CPC ........... *H04W 76/023* (2013.01); *H04L 67/104* (2013.01); *H04L 67/12* (2013.01); *H04W 12/06* (2013.01)

(58) Field of Classification Search
CPC .... H04W 76/023; H04W 12/06; H04L 67/12; H04B 5/0031; H04B 5/02; H04B 1/40; H04B 4/00; H04B 88/06
USPC ........................................................ 701/117
See application file for complete search history.

(56) References Cited

U.S. PATENT DOCUMENTS

| | | | |
|---|---|---|---|
| 8,989,954 B1 * | 3/2015 | Addepalli et al. | 701/32.3 |
| 2010/0115505 A1 * | 5/2010 | Touati et al. | 717/171 |
| 2010/0234071 A1 * | 9/2010 | Shabtay et al. | 455/562.1 |

(Continued)

FOREIGN PATENT DOCUMENTS

| | | |
|---|---|---|
| JP | 2012-175348 A | 9/2012 |
| JP | 2013-012825 A | 1/2013 |

(Continued)

OTHER PUBLICATIONS

H. Kim et al., "Trend and Security Issue of NFC Technology," The Korean Institute of Communications and Information Sciences, Information & Communication Magazine, vol. 29, No. 8, (Aug. 2012), pp. 57-64, with English abstract.

(Continued)

*Primary Examiner* — McDieunel Marc
*Assistant Examiner* — James E Stroud
(74) *Attorney, Agent, or Firm* — McDermott Will & Emery LLP

(57) ABSTRACT

A vehicle telematics system includes a local area communication interworking device and a telematics terminal. The local area communication interworking device is configured to receive a mobile terminal identification information from a mobile terminal and provide a telematics terminal identification information to the mobile terminal through a first local area wireless communication connection. The telematics terminal is configured to search for the mobile terminal and establish a P2P connection with the mobile terminal by requesting a second local area wireless communication connection to the searched mobile terminal, when the mobile terminal identification is received from the local area communication interworking device.

7 Claims, 3 Drawing Sheets

(56) References Cited

U.S. PATENT DOCUMENTS

| | | | |
|---|---|---|---|
| 2011/0117845 A1* | 5/2011 | Kirsch et al. | 455/41.2 |
| 2011/0219226 A1* | 9/2011 | Olsson et al. | 713/150 |
| 2012/0053793 A1* | 3/2012 | Sala et al. | 701/45 |
| 2014/0310075 A1* | 10/2014 | Ricci | 705/13 |
| 2014/0357295 A1* | 12/2014 | Skomra et al. | 455/456.1 |

FOREIGN PATENT DOCUMENTS

| | | |
|---|---|---|
| KR | 10-2005-0029823 A | 3/2005 |
| KR | 10-2007-0006128 A | 1/2007 |
| KR | 10-2010-0057732 A | 6/2010 |
| KR | 10-2013-0057301 A | 5/2013 |
| KR | 10-2013-0089964 A | 8/2013 |

OTHER PUBLICATIONS

Korean Office Action dated Jun. 28, 2015 issued in Korean Patent Application No. 10-2014-0029711.

* cited by examiner

TELEMATICS SYSTEM CAPABLE OF WI-FI DIRECT P2P CONNECTION USING NEAR FIELD COMMUNICATION

CROSS-REFERENCE TO RELATED APPLICATION

This application is based on and claims benefit of priority to Korean Patent Application No. 10-2014-0029711, filed on Mar. 13, 2014 in the Korean Intellectual Property Office, the entire content of which is incorporated herein by reference.

TECHNICAL FIELD

The present inventive concept relates to a telematics system of a vehicle, and more particularly, to a telematics system capable of easily providing direct connection between a mobile terminal of a user (driver) and a telematics terminal of a vehicle through Wi-Fi Direct using Near Field Communication and hereby, capable of using a telematics service and various multimedia service.

BACKGROUND

As a vehicle is widely spread in public, various devices for a vehicle capable of providing all sorts of convenience are developed, and one of these devices for a vehicle is a telematics device.

Recently, as a mobile terminal evolves into the type of a smart phone, the telematics device is interworked with the smart phone for providing more various services to a driver.

The telematics device and the mobile terminal are interworked using near field wireless communication, e.g., Bluetooth, for intercommunication. However, such Bluetooth communication is difficult to transmit and receive a large amount of messages (data), and there is a problem in that the communication is frequently disconnected.

SUMMARY

An aspect of the present inventive concept enables direct connection between a mobile terminal and a telematics terminal of a vehicle through Wi-Fi Direct, so that a telematics terminal and a mobile terminal can stably transmit and receive a large amount of data without disconnection.

Further, through a seamless stable connection between a mobile terminal and a telematics terminal, a telematics service and various multimedia services can be used.

One aspect of the present inventive concept relates to a vehicle telematics system including a local area communication interworking device and a telematics terminal. The local area communication interworking device is configured to receive mobile terminal identification information from a mobile terminal and provide telematics terminal identification information to the mobile terminal through a first local area wireless communication connection. The telematics terminal is configured to search the mobile terminal and establish a P2P connection with the mobile terminal by requesting a second local area wireless communication connection to the searched mobile terminal, when the mobile terminal identification is received from the local area communication interworking device.

The first local area wireless communication connection may be a NFC (Near Field Communication) connection that the local area communication interworking device establishes with the mobile terminal. The second local area wireless communication connection may be a Wi-Fi P2P connection that the telematics terminal establishes with the mobile terminal through Wi-Fi Direct function.

The local area communication interworking device may receive authentication information for using a telematics service from the mobile terminal and transmits the authentication information to the telematics terminal.

The local area communication interworking device and the telematics terminal may communicate with each other through any one of MOST (Media Oriented Systems Transports) network, CAN (Controller Area Network), and UART (Universal Asynchronous Receiver Transmitter).

The telematics terminal may store the authentication information in a memory, and use the authentication information stored in the memory when using the telematics service through the Wi-Fi P2P connection.

The mobile terminal may drive a dedicated application to exchange information required for the second local area wireless communication connection and the use of telematics service with the local area communication interworking device through the first local area wireless communication connection.

The telematics terminal may receive multimedia data stored in the mobile terminal by data sharing with the mobile terminal or use Internet service by connecting to a web server through the mobile terminal.

An aspect of the present inventive concept enables a telematics service and various multimedia services by easily setting up Wi-Fi direct connection between a mobile terminal and a telematics terminal of a vehicle by a driver.

BRIEF DESCRIPTION OF THE DRAWINGS

The above and other objects, features and advantages of the present inventive concept will be more apparent from the following detailed description taken in conjunction with the accompanying drawings, in which like reference characters may refer to the same or similar parts throughout the different views. The drawings are not necessarily to scale, emphasis instead being placed upon illustrating the principles of the embodiments of the inventive concept.

DETAILED DESCRIPTION

Hereinafter, referring to drawings attached, preferred embodiments of the present inventive concept will be described in detail. Prior to this, words and terms used in this specification and claims must not be construed as being limited in an usual or dictionary meaning, and must be understood as the meaning and concept meeting the technical concept of the present inventive concept based on the principle that a inventor can properly defines the concept of term to explain the inventive concept with the best way. Thus, since embodiments described herein and constitutions shown in drawings are just preferable embodiments and not represent all technical concept of the present inventive concept, at the time of the filing of this application, it must be understood that there are various equivalents and modifications which can replace them.

Figure 1:
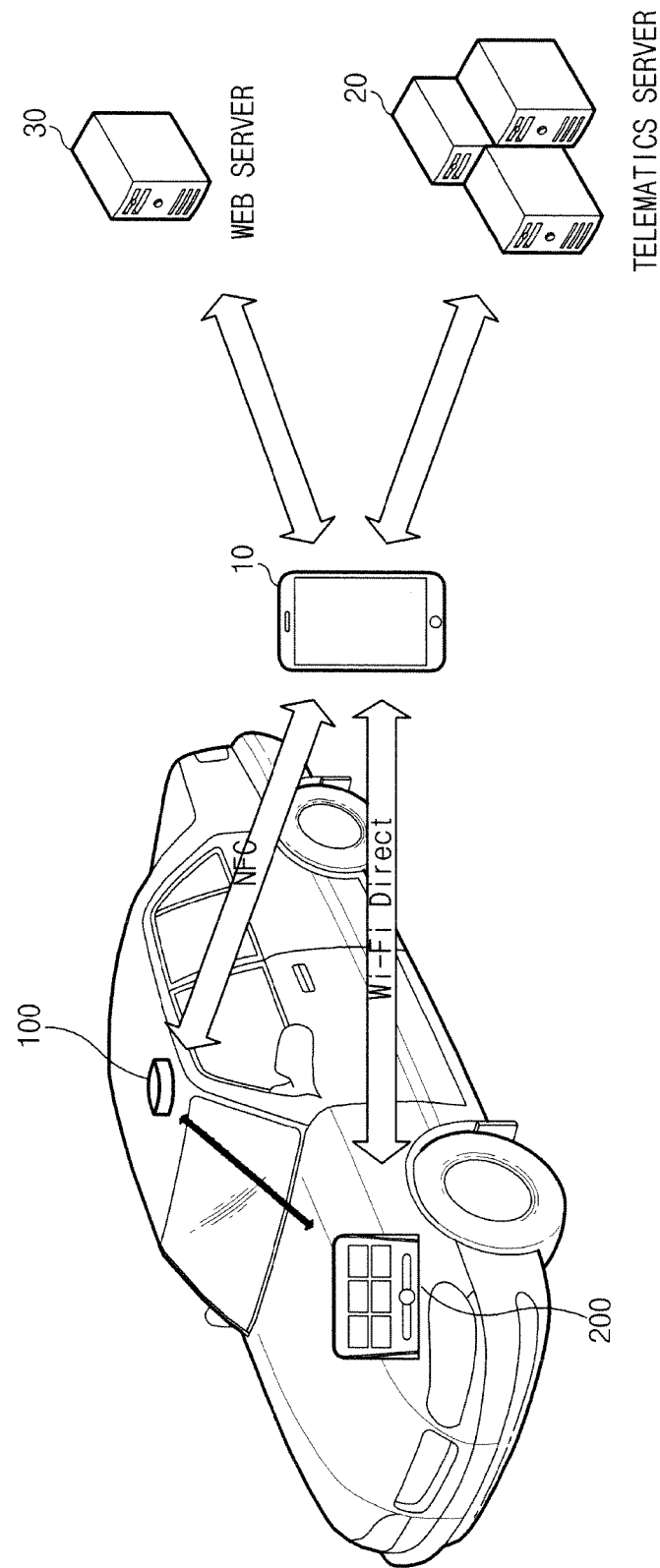
FIG. 1 is a diagram showing the configuration of a vehicle telematics system according to an embodiment of the present inventive concept.

FIG. 1 is a diagram showing the configuration of a vehicle telematics system according to an embodiment of the present inventive concept.

The telematics system according to an embodiment of the present inventive concept may include a local area communication interworking device 100 and a telematics terminal 200.

If the mobile terminal 10 of a user (driver) approaches or comes into contact with the local area communication interworking device 100, after setting up a local wireless communication, for example, a NFC (Near Field Communication) connection, the local area communication interworking device 100 may provide the mobile terminal 10 with the device information for the telematics terminal 200 (e.g., telematics terminal identification information), and may provide the device information for the mobile terminal 10 (e.g., mobile terminal identification information) and authentication information for using the telematics service. At this time, the authentication information may include an ID and a PW (password) required when connecting with a telematics server 20, and can be provided when the mobile terminal 10 is firstly connected with the local communication interworking device 100. The telematics terminal identification information may be stored in the local communication interworking device 100. The local communication interworking device 100 may transmit the authentication information and the mobile terminal identification information received from the mobile terminal 10 to the telematics terminal 200 through an in-vehicle network. At this time, the in-vehicle network may include one of MOST (Media Oriented Systems Transports) network, CAN (Controller Area Network), and UART (Universal Asynchronous Receiver Transmitter). The local area communication interworking device 100 may be positioned inside of the vehicle.

If the authentication information is received from the local area communication interworking device 100, the telematics terminal 200 may store the authentication information in a memory. And, the mobile terminal identification information may be received from the local area communication interworking device 100. After the telematics terminal 200 drives a Wi-Fi module, the Wi-Fi P2P connection with the mobile terminal 10 may be performed by requesting the WI-FI Direct connection to the mobile terminal 10 corresponding to the mobile terminal identification information according to the pre-defined Wi-Fi Direct Specification. That is, if the mobile terminal 10 approaches or come into contact with the local area communication interworking device 100, the telematics terminal 200 may perform an establishment of the Wi-Fi connection with the mobile terminal 10. If the Wi-Fi direct connection between the mobile terminal 10 and the telematics terminal 200 is created, the telematics terminal 200 may connect to the telematics server 20 via the mobile terminal 10, and then can be provided with the telematics service using pre-stored authentication information. Also, the telematics terminal 200 may connect to a web server 30 via the mobile terminal 10 and can use an Internet service or be provided with the multimedia data (video, music, etc.) stored in the mobile terminal 10. The telematics terminal 200 can directly run the multimedia data provided by the mobile terminal 10 or transmit the multimedia data to the in-vehicle multimedia device and cause the multimedia data to be run through the multimedia device. Also, the telematics terminal 200 may further include a communication modem capable of directly connecting with the telematics server 20 through a designated communication network as in a conventional manner.

The mobile terminal 10 may be a portable electronic device that is easily movable, and a dedicated application supporting NFC (Near Field Communication) and Wi-Fi Direct connection function may be installed therein. If the mobile terminal 10 of a user approaches or come into contact with the local area communication interworking device 100, the mobile terminal 10 may generate the trigger event of NFC to set up the NFC connection with the local area communication interworking device 100 by activating a NFC module, and exchange information with the local area communication interworking device 100 by driving the dedicated application. For example, the mobile terminal 10 may transmit the mobile terminal identification information and the authentication information to the local area communication interworking device 100, and may receive telematics terminal identification information from the local area communication interworking device 100. And, after the mobile terminal 10 activates the Wi-Fi module, if a Wi-Fi Direct connection request is received from the device corresponding to the telematics terminal identification information, the Wi-Fi P2P connection with the telematics terminal 200 may be performed by automatically approving the Wi-Fi Direct connection request. This mobile terminal 10 may include a smart phone, a portable computer (notebook, tablet, etc.), a PDA (Personal Digital Assistant), a PMP (Portable Multimedia Player), a DMB (Digital Multimedia Broadcasting) terminal, a portable game machine, camera, etc.

Figure 2:
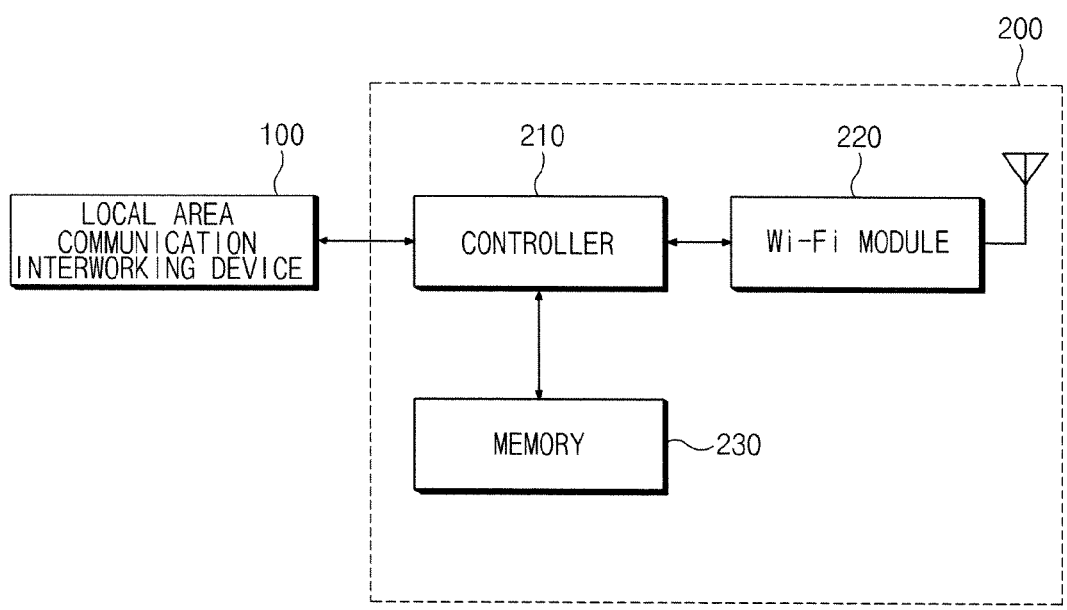
FIG. 2 is a diagram showing the configuration of a telematics terminal in FIG. 1.

FIG. 2 is a diagram showing the configuration of the telematics terminal in FIG. 1.

The telematics terminal 200 may include a controller 210, a Wi-Fi module 220, and a memory 230.

The controller 210 may entirely control the operation of the telematics terminal 200. In particular, in an embodiment of the present inventive concept, if the mobile terminal identification information is received from the local area communication interworking device 100, the controller 210 may activate the Wi-Fi module 220, and then transmit a request signal requesting a Wi-Fi Direct connection to the mobile terminal 10. For example, the controller 210 may activate the Wi-Fi module, and then search for a device for the Wi-Fi P2P connection. If the terminal corresponding to the mobile terminal identification information provided by the local area communication interworking device 100 is searched, the controller 210 may transmit the request signal requesting the Wi-Fi Direct connection to the corresponding terminal, i.e., the mobile terminal 10. Also, the controller 210 may store the authentication information provided from the local area communication interworking device 100 in a memory 230, and may use the authentication information stored in the memory 230 when connecting to the telematics server 20 and using the telematics service.

The Wi-Fi module 220 may convert the signal from the controller 210 to a Wi-Fi signal and output the signal according to the IEEE 802.11 Specification, and if the Wi-Fi signal is received, demodulate and transmit the Wi-Fi signal to controller 210. In particular, the Wi-Fi module 220 may have 802.11g or more (for example, 802.11g or 802.11n) capable of supporting the Wi-Fi Direct function.

The memory 230 may store information necessary for operation of the telematics terminal 200. In particular, the memory 230 may store the authentication information provided from the local area communication interworking device 100.

Figure 3:
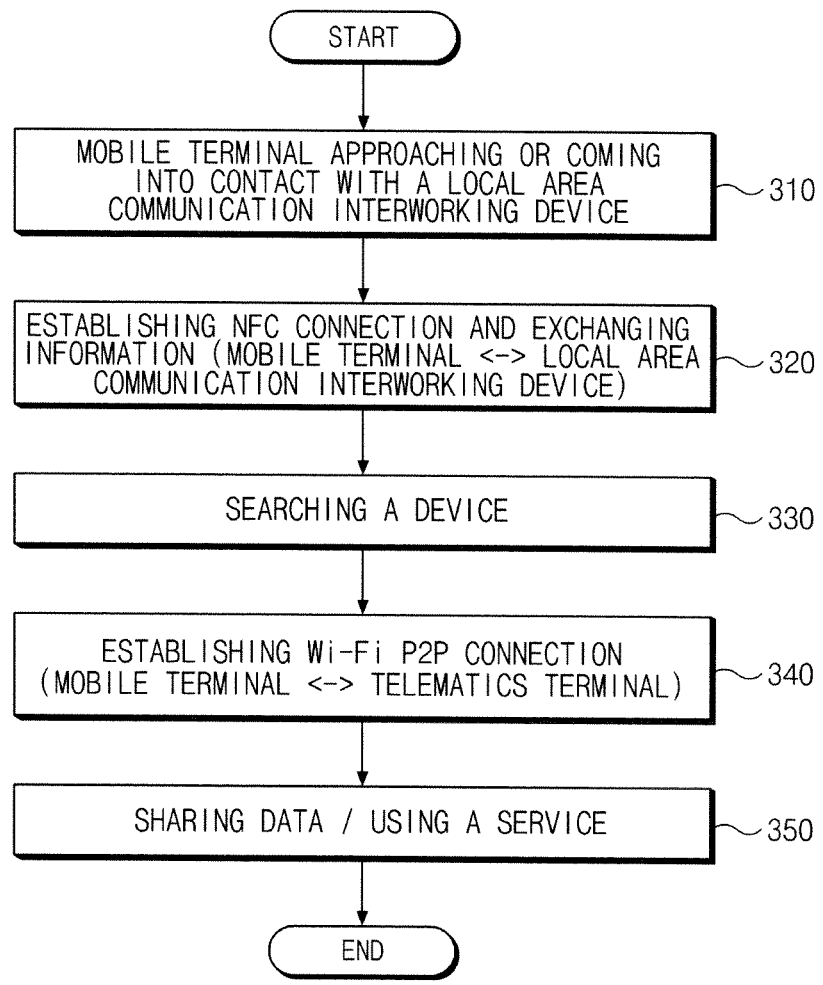
FIG. 3 is a flow chart for explaining a method of performing a Wi-Fi P2P connection and using a telematics service according to an embodiment of the present inventive concept.

FIG. 3 is a flow chart for explaining the method which performs a Wi-Fi P2P connection and uses a telematics service according to an embodiment of the present inventive concept.

After a user (driver) gets into the vehicle, the user may turn on the ignition, and supply power to the telematics system.

Subsequently, the mobile terminal 10 of the user may approach or come into contact with the local are communication interworking device 100 (step 310).

If the mobile terminal 10 approaches or come into contact with the local area communication interworking device 100, the mobile terminal 10 may establish NFC connection with the local area communication interworking device 100 by generating the trigger event of NFC, and then activating the NFC module. By driving the dedicated application, the mobile terminal 10 may exchange information required for the Wi-Fi P2P connection and the use of telematics service with the local area communication interworking device 100 through NFC (step 320).

For example, the mobile terminal 10 may transmit the mobile terminal identification information including the device information for the mobile terminal 10 and the authentication information required for using the telematics service to the local area communication interworking device using NFC, and may receive the telematics terminal identification information including the device information for the telematics terminal 200 from the local area communication interworking device 100. At this time, the telematics terminal identification information may be stored in the local area communication interworking device 100. And, the authentication information may be provided to the telematics system only once when the mobile terminal 10 is firstly connected to the local area communication interworking device 100.

The local area communication interworking device 100 may transmit the mobile terminal identification and the authentication information provided from the mobile terminal 10 to the controller 210 of the telematics terminal 200.

The controller 210 may store the received authentication information in the memory 230, and after activating the Wi-Fi module 220, the controller 210 may search for a device for the Wi-Fi P2P connection through the Wi-Fi Direct function (step 330).

For example, the controller 210 may activate the Wi-Fi module 220, and then search for a device for the Wi-Fi P2P connection by performing channel scan, listen, search operations of IEEE 802.11. Also, the mobile terminal 10 may activate the Wi-Fi module, and then search for a device for the Wi-Fi P2P connection through the Wi-Fi Direct function when the telematics terminal identification is received from the local area communication interworking device 100 or when the dedicated application is driven.

As searching for the device, if the mobile terminal 10 and the controller 210 are recognized by each other using the identification information exchanged in step 320, the controller 210 may transmit a request signal requesting the Wi-Fi P2P connection to the mobile terminal 10 through the Wi-Fi module 220. If the Wi-Fi P2P connection request is received from the telematics terminal 200, the mobile terminal 10 may automatically approve the connection request to establish the Wi-Fi P2P connection using the Wi-Fi Direct function between the mobile terminal 10 and the telematics terminal 200 (step 340).

If the Wi-Fi P2P connection is established between the mobile terminal 10 and the telematics terminal 200, the telematics terminal 200 may connect to the telematics server 20 through the mobile terminal 10 and then can use the telematics service using the authentication information stored in the memory 230 (step 350). Alternatively, the telematics terminal 200 can receive the multimedia data stored in the mobile terminal 10 by data sharing with the mobile terminal 10 or use Internet service by connecting to the web server 30 through the mobile terminal 10.

The above described embodiments of the present inventive concept are for the purpose of illustration, it will be understood by those skilled in the art that various modifications, changes, replacements and addition may be made therein with departing from the spirit and scope of the appended claims, and these modifications and changes are said to belong to the scope of the following claims.

What is claimed is:

1. A vehicle telematics system, comprising:
    a local area communication interworking device configured to receive mobile terminal identification information from a mobile terminal and provide telematics terminal identification information to the mobile terminal through a first local area wireless communication connection; and
    a telematics terminal configured to search for the mobile terminal and establish a P2P connection with the mobile terminal by requesting a second local area wireless communication connection to the searched mobile terminal, when the mobile terminal identification is received from the local area communication interworking device,
    wherein the local area communication interworking device receives authentication information for using a telematics service from the mobile terminal and transmits the authentication information to the telematics terminal.

2. A vehicle telematics system according to claim 1, wherein the first local area wireless communication connection is an NFC (Near Field Communication) connection that the local area communication interworking device establishes with the mobile terminal.

3. A vehicle telematics system according to claim 1, wherein the second local area wireless communication connection is a Wi-Fi P2P connection that the telematics terminal establishes with the mobile terminal through Wi-Fi Direct function.

4. A vehicle telematics system according to claim 1, wherein the local area communication interworking device and the telematics terminal communicate with each other through any one of MOST (Media Oriented Systems Transports) network, CAN (Controller Area Network), and UART (Universal Asynchronous Receiver Transmitter).

5. A vehicle telematics system according to claim 1, wherein:
    the second local area wireless communication connection is a Wi-Fi P2P connection that the telematics terminal establishes with the mobile terminal through Wi-Fi Direct function, and
    the telematics terminal stores the authentication information in a memory, and uses the authentication information stored in the memory when using the telematics service through the Wi-Fi P2P connection.

6. A vehicle telematics system according to claim 1, wherein the mobile terminal drives a dedicated application to exchange information required for the second local area wireless communication connection and the use of telematics service with the local area communication interworking device through the first local area wireless communication connection.

7. A vehicle telematics system according to claim 1, wherein the telematics terminal receives multimedia data stored in the mobile terminal by data sharing with the mobile terminal or use Internet service by connecting to a web server through the mobile terminal.

* * * * *